United States Patent [19]
Allaf et al.

[11] Patent Number: 5,855,941
[45] Date of Patent: Jan. 5, 1999

[54] METHOD FOR PROCESSING MATERIALS TO CHANGE THEIR TEXTURE, APPARATUS THEREFOR, AND RESULTING MATERIALS

[75] Inventors: Karim Allaf; Nicolas Louka, both of Compiegne; Francis Parent, Nouvion-et-Catillon; Jean-Marie Bouvier, Compiegne; Michel Forget, Bergnicourt, all of France

[73] Assignee: Gradient, Compiegne, France

[21] Appl. No.: 592,417

[22] PCT Filed: Aug. 3, 1994

[86] PCT No.: PCT/FR94/00975

§ 371 Date: Jul. 12, 1996

§ 102(e) Date: Jul. 12, 1996

[87] PCT Pub. No.: WO95/04466

PCT Pub. Date: Feb. 16, 1995

[30] Foreign Application Priority Data

Aug. 6, 1993 [FR] France .................................. 93 09728

[51] Int. Cl.⁶ ...................................................... A23L 3/015
[52] U.S. Cl. .......................... 426/447; 426/312; 426/615; 426/465; 426/520; 99/467; 99/468; 99/472; 99/477; 99/483
[58] Field of Search ..................................... 426/447, 312, 426/615, 520, 465; 99/467, 468, 472, 473, 477, 483

[56] References Cited

U.S. PATENT DOCUMENTS

| | | | |
|---|---|---|---|
| 2,091,372 | 8/1937 | Moore | 426/447 X |
| 2,110,184 | 3/1938 | Webb | 426/447 |
| 2,278,469 | 4/1942 | Musher | 426/447 |
| 3,637,400 | 1/1972 | Mullen et al. | 426/447 X |
| 3,650,763 | 3/1972 | Touba | 426/447 X |
| 3,754,930 | 8/1973 | Toei et al. | 426/447 |
| 4,006,260 | 2/1977 | Webb et al. | 426/465 X |
| 4,055,675 | 10/1977 | Popper et al. | 426/447 X |
| 4,209,537 | 6/1980 | Wood | 426/447 X |
| 4,292,334 | 9/1981 | Nishizawa et al. | 426/447 |
| 4,948,609 | 8/1990 | Nafisi-Movaghar | 426/447 X |
| 5,188,856 | 2/1993 | Hinz et al. | 426/465 |

FOREIGN PATENT DOCUMENTS

| | | |
|---|---|---|
| 0435302 | 7/1991 | European Pat. Off. . |
| 0455976 | 11/1991 | European Pat. Off. . |
| 0525213 | 2/1993 | European Pat. Off. . |
| 2618981 | 2/1989 | France . |
| 59-159739 | 9/1984 | Japan . |
| 01153036 | 6/1989 | Japan . |

*Primary Examiner*—Milton Cano
*Attorney, Agent, or Firm*—Weiser and Associates P.C.

[57] ABSTRACT

Materials, for example, plant-based food products, are subjected to heat and pressure in a processing enclosure, wherein the pressure is greater than the pressure of the atmosphere. The heated, pressurized materials are then subjected to a pressure-reduction phase during which the pressure in the processing enclosure is reduced at a rate greater than 500 millibars per second and by an amplitude greater than 1 bar. The rapid pressure-reduction phase of the invention contributes to the production of processed materials having a slightly spongy structure that is due to the presence of micro-cavities that promote the recapture of subsequent moisture.

28 Claims, 3 Drawing Sheets

METHOD FOR PROCESSING MATERIALS TO CHANGE THEIR TEXTURE, APPARATUS THEREFOR, AND RESULTING MATERIALS

BACKGROUND OF THE INVENTION

1. Field of the Invention

The present invention concerns a procedure for processing biological products in order to modify their biological, mechanical and textural properties in order, in particular, to prepare soufflé-type food products and dehydrated food products or in order to use or improve the processes for the extraction of essences or essential oils or, in addition, for carrying out bactericidal treatments.

2. Description of the Related Art

Procedures are known in the prior art for processing biological products in order to modify their texture, particularly dehydration procedures, that comprise:

a step involving the introduction of the biological products into a hermetic enclosure;

a step involving the heating of the products that have been deposited in the enclosure, whereby the aforementioned products are subjected to a pressure that is greater than the pressure of the atmosphere;

a subsequent step of relieving the excess pressure.

European patent EP525213 describes such a process for the dehydration of pieces of vegetables, fruits or cereal grains that comprises several steps as follows:

evacuating the enclosure in which one deposits the products, that are to be dehydrated, together with an adsorption device until a partial pressure of the air is obtained in the aforementioned enclosure that is between 1 and 2 mbars;

increasing the total pressure in the enclosure to between 7 and 200 mbars via the introduction of a coolant gas;

maintaining the desired pressure;

stopping the operation;

pressurizing the enclosure and the adsorption device to the pressure of the atmosphere.

Another patent of the prior art, European patent EP435302, describes a procedure for the total or partial dehydration of pieces of entire biological products of the vegetable, fruit or flower type, a dehydration device and the corresponding products, whereby the procedure comprises a succession of steps:

evacuating the enclosure in which the dressed products are deposited on plates;

heating the wall of the enclosure;

introducing water vapor into the enclosure;

re-evacuating the enclosure;

heating the plates;

re-pressurizing the enclosure to the pressure of the atmosphere.

European patent EP0421902 divulges a process for drying pieces of wood, whereby the process comprises:

introducing the pieces, that are to be dried, into the enclosure that is then sealed hermetically;

increasing the internal temperature of the enclosure to a value between 50° and 90° C.;

stabilizing or equilibrating the internal temperature of the enclosure with that of the pieces by carrying out a step in which time is allowed to pass by with a duration of at least one minute;

then subjecting the interior of the hermetic enclosure to a partial vacuum of between 0.5 and 0 bar over a time period of between 30 seconds and 3 minutes while ensuring a forced circulation of air in the interior of the enclosure and over the pieces that are to be dried;

re-subjecting the interior of the enclosure to the ambient pressure of the atmosphere.

Another document of the prior art, French patent FR2618981, describes a procedure for processing fresh vegetables. According to this document, one processes the vegetables with steam in an air-tight enclosure and the enclosure is evacuated after processing.

This document states that communication between the source of the vacuum and the enclosure slowly reduces the pressure in the enclosure, whereby the pressure-reduction phase lasts approximately two minutes and forty five seconds or even nine minutes in another experiment that is mentioned in this prior art document.

In a general manner, the pressure-reduction phase that is provided in the prior art documents is intended only to produce a thermodynamic evaporation effect under vacuum.

Another document of the prior art, European patent EP0455976, divulges a process for drying, whereby drying is accompanied by a pressure-reduction phase over a period of less than 30 seconds.

This document does not concern a process that is designed to modify the texture of the plant-based product but a process for drying products.

The first sentence of the patent EP0455976 and the preamble of the main claim states, without ambiguity, that the subject of the invention is the drying of biological products.

The teaching of this prior art document corresponds to a drying process that is accompanied (and not therefore followed) by a pressure-reduction phase extending over a period of less than 30 seconds. This period of time constitutes an order of magnitude that is significantly different from the duration of the sharp pressure-reduction that is of the order of one second.

The technical effect of the slow reduction in pressure according to EP455976 is also mentioned in this document: it has the objective of bringing about the "opening" of the cells in such a way as to permit equilibration of pressures with a view to better diffusion of water vapor (see page 3, lines 1–5 of patent application EP455976). It appears by means of experimentation that reductions in pressure that are effected over times of the order of 30 seconds are translated into a simple improvement of the diffusion of water vapor that assists the drying phase but does not modify the microstructure of the material in any way.

SUMMARY OF THE INVENTION

The subject of the present invention is to propose a procedure for processing that additionally comprises a sharp pressure-reduction step, that produces a mechanical effect on the products that are contained in the enclosure that is used for processing, following a heating phase and pressurization of the products. This sharp pressure-reduction provokes rapid vaporization of the water that is contained in the plant-based products that, in the case of certain biological materials, is translated into an expansion of the product. One thus obtains a slightly spongy structure that is due to the presence of micro-cavities that promote the recapture of subsequent moisture when the processing procedure has the objective of producing dehydrated foods, or the extraction of essences, essential oils or other molecules when the processing procedure has the objective of producing such substances. In addition, the sharp pressure-reduction phase causes instantaneous cooling of the product that permits a reduction in thermal degradation processes.

More particularly, the invention concerns a processing procedure comprising a sharp pressure-reduction phase during which the rate DP/DT of the variation of the internal pressure in the enclosure is greater than 500 millibars per second, and is preferably greater than 1 bar per second, whereby the amplitude DP of the variation during the aforementioned sharp pressure-reduction phase is greater than 1 bar. The duration of the phase of sharp pressure-reduction is preferably less than 0.5 second.

The procedure in accordance with the invention advantageously comprises an intermediate step involving a slow reduction in pressure prior to the heating step and the pressurization of the enclosure.

The increase in the temperature during the heating stage is preferably effected in stages, whereby the temperature is maintained essentially constant after each increase in temperature. In the case of heating by dry steam, the increase in pressure during the heating step is also effected in stages, whereby the pressure variation cycles are essentially synchronized with the temperature variation cycles.

The pressure in the interior of the enclosure is advantageously less than 0.5 bar at the end of the sharp pressure-reduction phase.

The invention also concerns a process comprising an initial step for regulating the parameters that relate to the initial pressure $P_i$, that prevails in the enclosure prior to the sharp pressure-reduction phase, and the nominal pressure $P_r$ in a vacuum reservoir, that is in communication with the enclosure during the sharp pressure-reduction step, and the duration $t_c$ of the heating phase under pressure by successive adjustment after each processing cycle, whereby the aforementioned parameters are fixed when the final product is considered to be satisfactory.

The invention also concerns an apparatus for the processing of biological products in order to modify their texture, whereby the apparatus is of the type comprising an enclosure that is designed to receive the products that are to be processed, means for heating the aforementioned enclosure and means for increasing the pressure in the aforementioned enclosure and means for evacuating the aforementioned enclosure, characterized by the feature that the aforementioned apparatus comprises, in addition, a reservoir with a capacity that is at least 5 times greater and, preferably, at least 20 times greater than the capacity of the processing enclosure, whereby a rapid-acting valve is inserted between the processing enclosure and the vacuum reservoir and whereby the vacuum reservoir is connected to a vacuum pump and whereby the flow rate for the rapid-acting valve is determined in such a way as to permit equilibration of the pressures in the enclosure and the vacuum reservoir within a time period that is less than one second.

The apparatus in accordance with the invention advantageously comprises a second enclosure for the recovery of the processed products that is linked to the processing enclosure by means of a main pipe into which a secondary pipe opens out for supplying the vacuum reservoir, whereby the rapid-acting valve is arranged between the processing enclosure and the connection of the secondary pipe to the main pipe. This mode of implementation permits one to profit from the aspiration effect, that is produced by opening the valve, for expelling the processed products out of the enclosure and thus reducing the number of manipulations or maintaining the walls of the enclosure at an elevated temperature.

The invention also concerns dry food products that are instantaneously capable of rehydration and that exhibit a level of expansion between 1.5 and 5.

BRIEF DESCRIPTION OF THE DRAWINGS

The invention will be better understood by reading the description that follows while making reference to the appended drawings where.

DETAILED DESCRIPTION

Figure 1:
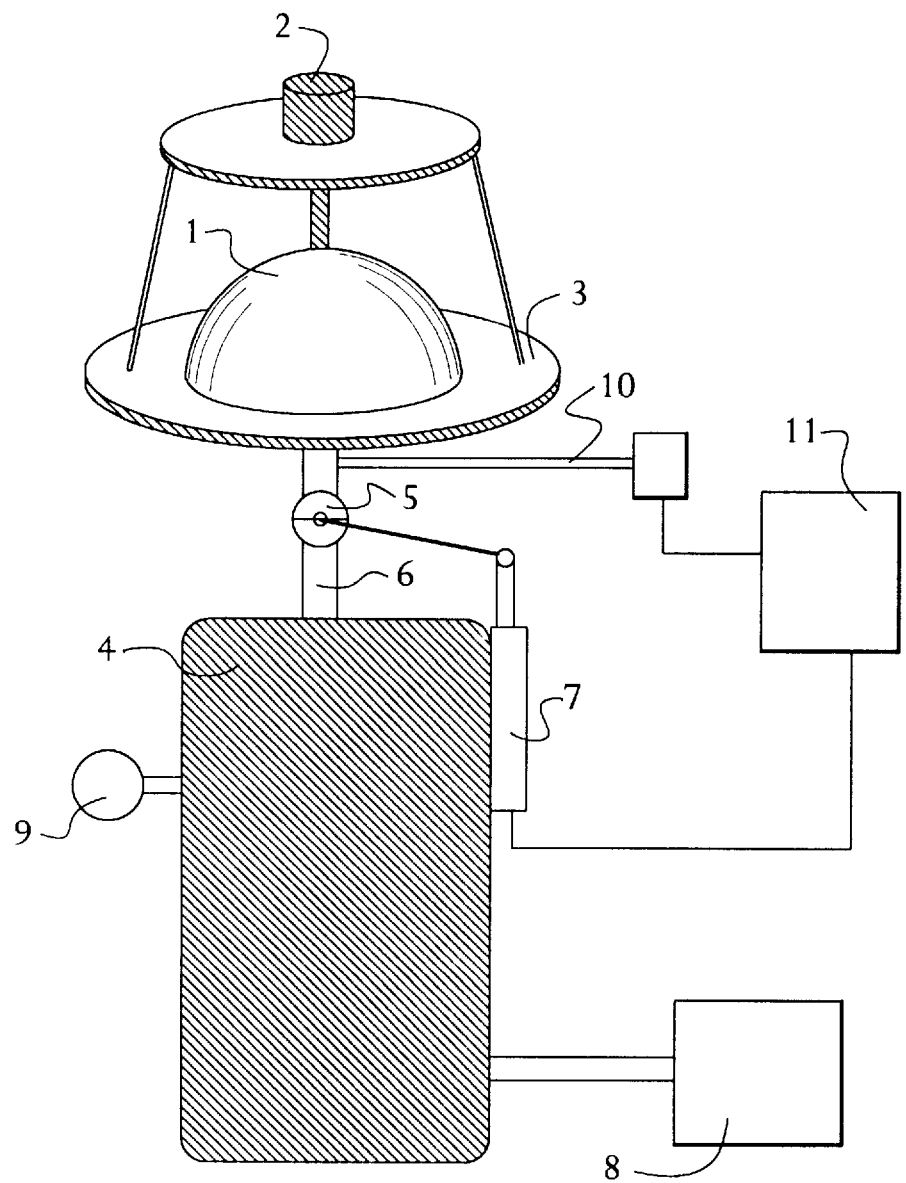
FIG. 1 depicts a schematic view of an apparatus in accordance with the invention.

The apparatus comprises a processing enclosure (1) in the form of a bell jar with a capacity of 5 liters that is arranged on a plate (3). A screw jack (2) ensures the opening of the enclosure or its air-tight closure during the processing cycle. A manometer, that is not depicted in the figure, and a thermocouple optionally permit one to verify the pressure and the temperature in the enclosure.

The enclosure (1) is connected to a vacuum reservoir (4) with a volume of less than 200 liters by means of a pipe (6) of large cross section and a rapid-acting valve (5). A screw jack (7) ensures the opening and closing of the valve (5). A vacuum pump (8) of known type is connected to the vacuum reservoir (4) in order to achieve initial de-pressurization and thus to maintain the nominal de-pressurization in the vacuum reservoir (4).

A manometer (9) permits one to verify the nominal de-pressurization in the vacuum reservoir (4).

An inlet port (10) for a coolant fluid, for example water vapor, opens out in the enclosure (1). The enclosure optionally comprises an additional source of heating by convection, via infrared radiation, or any other known type of heating. The apparatus is controlled by a micro-computer (11) that effects the pressurization/de-pressurization sequences and controls the temperature in the interior of the enclosure.

The functioning of the apparatus is as follows.

One proceeds first of all to a parameter adjustment phase during which one experimentally optimizes certain parameters, that are capable of being regulated, especially:

the pressure $P_0$ in the enclosure just before the phase that involves heating under pressure;

the maximum pressure $P_{max}$ in the enclosure;

the temperature $temp_{max}$ in the enclosure before the sharp pressure-reduction phase;

the time $T_{heating}$ in the step that involves heating under pressure;

the nominal pressure $P_{nom.}$ in the vacuum reservoir (4).

These parameters are registered in the active memory of the microcomputer and are re-updated at each cycle of the parameter-adjustment phase.

The parameter-adjustment procedure is effected by observing the influence of a change in one of the parameters on the levels of quality of the plant-based product that has been processed. For this purpose, one proceeds with successive increases and decreases until each of the parameters is optimized. At the end of this parameter-adjustment phase, the data that are registered in the active memory of the micro-computer are determined and one can proceed to running the apparatus operationally.

The maximum temperature is determined by awaiting, without any delay, the surpassing of the glass transition phase of the processed product, whereby this is translated into softening of its structure.

Figure 2:
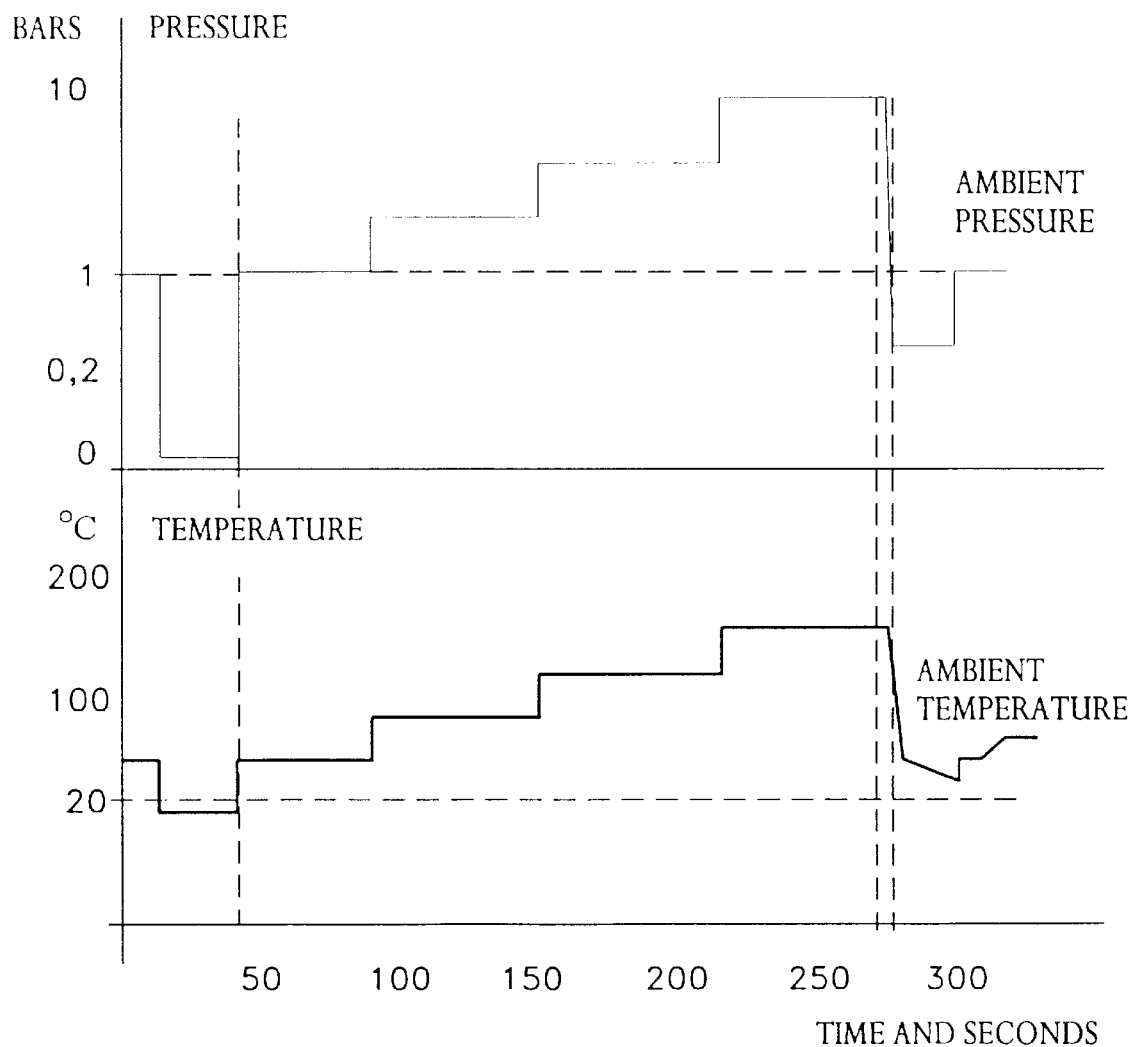
FIG. 2 depicts curves for the variation in pressure and temperature.

The processing procedure in the example that is described comprises an optional phase of pre-depressurization, a phase involving increasing the temperature and the pressure and a phase involving a sharp pressure-reduction. FIG. 2 depicts the pressure and temperature curve for an example of processing.

The food products are introduced into the enclosure after an optional pretreatment. They are made up of fine slices of biological materials. By way of example, the thickness of the slices is between 1 and 5 millimeters.

STEP 1

The first step consists of carrying out partial evacuation of the enclosure (1) by briefly opening the valve (5). De-pressurization causes slight cooling of the products because of the reduction in pressure. De-pressurization is maintained for a short time that is of the order of one minute and, preferably, between 10 seconds and 5 minutes. However, the duration of this phase is not critical.

The pre-depressurization phase has, as its objective, the improvement and acceleration of heat transfer across the product during the course of the heating step.

STEP 2

The following step comprises progressively increasing the temperature and the pressure. The temperature increases by successive stages starting from the ambient temperature up to a maximum temperature $Temp_{max}$ that depends on the nature of the product that is to be processed. Heating can be achieved by the injection of water vapor, via convection, via infrared or by a combination of different means of heating.

During this step, the pressure of the water vapor in the interior of the enclosure also increases in stages. This step lasts for several seconds up to several dozen minutes. In the example that is described, the temperature varies between the ambient temperature and 175° C. and the pressure varies from 1 bar to 9 bars. The duration of the heating phase preferably does not exceed one minute and the heating temperature only slightly exceeds the softening temperature of the product that is being processed.

STEP 3

The new step in the invention comprises a rapid change in the pressure starting at the end of the heating phase. In the example that is described, this pressure change exceeds 9.5 bars in less than half a second. At the same time, the heating process is interrupted and the reduction in pressure produces a sharp decrease in temperature. The product is then removed from the enclosure.

Example for Carrying Out the Procedure for Processing Potatoes

| Level of expansion | Operating conditions | Quality |
|---|---|---|
| e = 1.75 | Dimensions: 10 × 10 × 2 mm³<br>W (initial level of humidity): 13%<br>Method of heating:<br>$P_0$: 4.75 bar<br>$T_{heating}$: 20 seconds<br>$P_{nom.}$: 0.1 bar<br>Duration of the sharp pressure-reduction phase: 0.5 seconds | Very good quality with good levels of color (clear), rehydration capacity and texture |
| e = 1.75 | Dimensions: 10 × 19 × 2 mm³<br>W: 23%<br>Method of heating:<br>Saturated water vapor at<br>$P_0$: 6 bar<br>$T_{heating}$: 40 seconds<br>$P_{nom.}$: 0.1 bar<br>Duration of the sharp pressure-reduction phase: 0.5 seconds | Color: darkened<br>Rehydration capacity: average<br>Texture: good crispness |
| e = 1.9 | Dimensions: 10 × 19 × 2 mm³<br>W: 23%<br>Method of heating:<br>Saturated water vapor at<br>$P_0$: increased in stages<br>$T_{heating.1}$: 45 at 3.5 bar<br>$T_{heating.2}$: 20 at 5 bar<br>$P_{nom.}$: 0.1 bar<br>Duration of the sharp pressure-reduction phase: 0.5 seconds | Color: clear natural<br>Rehydration capacity: rapid<br>Texture: good crispness |
| e = 1.9 | Dimensions: 10 × 10 × 2 mm³<br>W: 23%<br>Method of heating:<br>Saturated water vapor at<br>$P_0$: 6 bar<br>$T_{heating}$: 70 seconds<br>$P_{nom.}$: 0.1 bar<br>Duration of the sharp pressure-reduction phase: 0.5 seconds | Color: very much darkened<br>Rehydration capacity: mediocre<br>Texture: crisp |
| e = 2.2 | Dimensions: 10 × 10 × 2 mm³<br>W: 23%<br>Method of heating: infrared<br>$P_0$: 6 bar<br>$T_{heating}$: 40 seconds<br>$P_{nom.}$: 2 bar of compressed air<br>Duration of the sharp pressure-reduction phase: 0.5 seconds | Color very variable<br>Rehydration capacity: good to average<br>Texture: crispy |

Example for Carrying Out the Procedure for Processing Carrots

| Level of expansion | Operating conditions | Quality |
|---|---|---|
| e = 2.2 | Dimensions: 16 × 16 × 2 mm³<br>W: 22%<br>Method of heating:<br>Saturated water vapor at<br>$P_0$: increased in stages<br>$T_{heating.1}$: 25 s at 3 bar, then<br>$T_{heating.2}$: 20 s at 5 bar<br>$P_{nom.}$: 0.1 bar<br>Duration of the sharp pressure-reduction phase: 0.5 seconds | Very good quality with good levels of color (natural), rehydration capacity (very rapid rehydration) and texture |
| e = 2.2 | Dimensions: 16 × 16 × 2 mm³<br>W: 23%<br>Method of heating:<br>Saturated water vapor at<br>$P_0$: 5 bar<br>$T_{heating}$: 45 seconds<br>$P_{nom.}$: 0.1 bar<br>Duration of the sharp pressure-reduction phase: 0.5 seconds | Color: darkened<br>Rehydration capacity: average<br>Texture: good crispness |
| e = 1.9 | Dimensions: 16 × 16 × 2 mm³<br>W: 23%<br>Method of heating:<br>Saturated water vapor at | Color: natural<br>Rehydration capacity: rapid<br>Texture: good crispness |

-continued

|  | $P_0$: 3 bar<br>$T_{heating}$: 45 seconds<br>$P_{nom.}$: 0.1 bar<br>Duration of the sharp<br>pressure-reduction<br>phase: 0.5 seconds |  |
|---|---|---|
| e = 2.2 | Dimensions: 10 × 10 × 2 mm³<br>W: 150%<br>Method of heating:<br>Infrared<br>$P_0$: 6 bar<br>$T_{heating}$: 3 seconds<br>$P_{nom.}$: 0.1 bar<br>Duration of the sharp<br>pressure-reduction<br>phase: 0.5 seconds | Color very variable<br>Rehydration capacity:<br>good to average<br>Texture: crispy |

One is to understand the term "duration of the sharp pressure-reduction phase" as being the time, to the nearest 10%, that is necessary for equilibration of the pressure between the vacuum reservoir and the processing enclosure after opening the rapid-acting valve.

Figure 3:
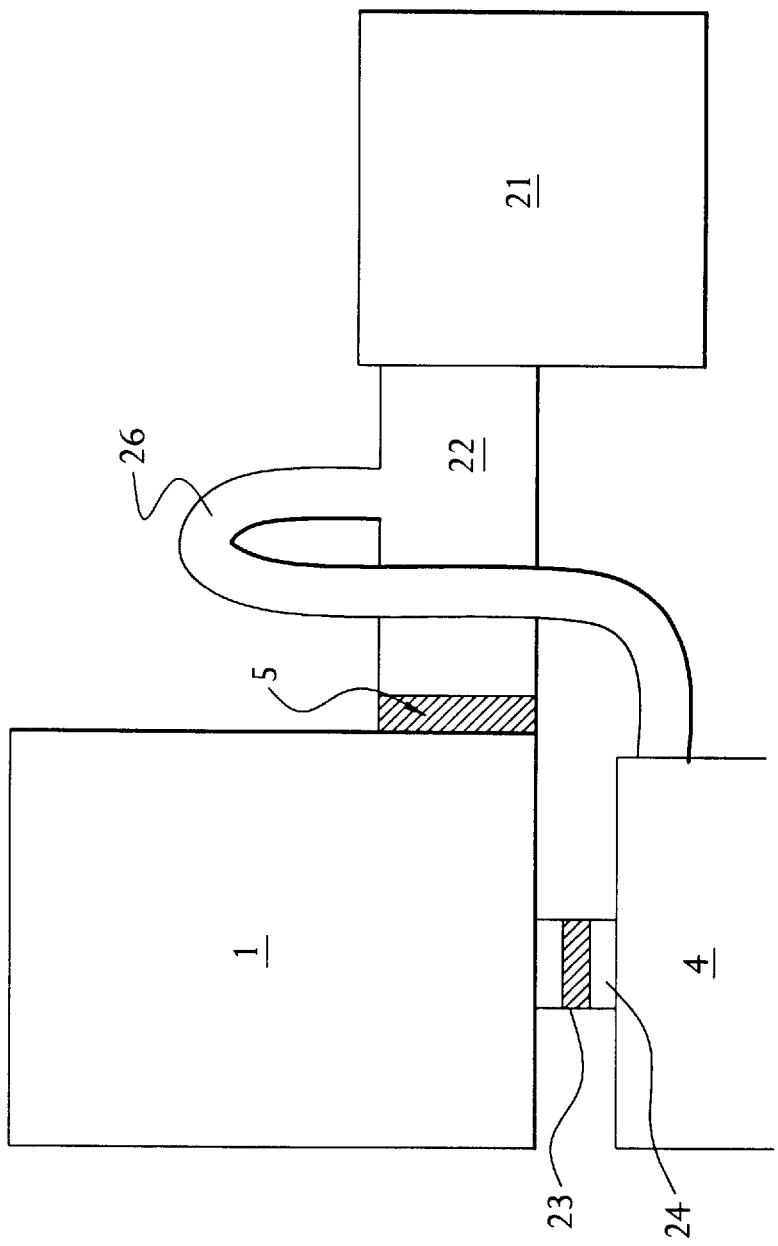
FIG. 3 depicts a schematic view of an apparatus in accordance with a variant of the invention.

FIG. 3 depicts a variant of the assembly of the apparatus.

The enclosure (1) communicates with the vacuum reservoir (4) by means of a first pipe (24) that is equipped with a control valve (23). The apparatus also comprises a tubular pipe (22) that connects the processing enclosure (1) to a recovery enclosure (21) that is cylindrical or conical in shape.

This pipe (22) is connected to the vacuum reservoir (4) via the intermediacy of a pipe (26). The pipe (22) opens out tangentially in the recovery enclosure (21) in such a way as to generate a cyclone effect. This pipe (26) opens out in the tubular pipe (22) in the upper part. A rapid-acting valve (5) is arranged between the processing enclosure (1) and the connection between the tubular pipe (22) and the pipe (26).

At rest, the two valves (5) and (23) are closed.

Because of this, the tubular pipe (22) and the recovery enclosure (21) are at a level of de-pressurization that corresponds to the pressure that prevails in the vacuum reservoir (4).

At the start of a processing cycle, one opens the valve (23), whereby this provokes a slow reduction in pressure in the processing enclosure (1). The valve (23) is then closed again. At the end of the heating phase and pressurization, the rapid-acting valve (5) is rotated into the open position, whereby this provokes a sharp pressure-reduction in the interior of the processing enclosure (1). This sharp pressure-reduction causes aspiration of the products that are contained in the processing enclosure (1) and these are expelled into the recovery enclosure (21). The cylindrical shape of the recovery enclosure (21) and the tangential connection of the tubular pipe (22) bring about cyclonic movement of the products and this prevents the agglomeration of the aforementioned products that have been processed.

These are recovered at the bottom of the enclosure (21).

The invention is described in the preceding sections by means of a non-limitative example. It is to be understood that someone who is skilled in the art will be able, on his own, to generate various variants without departing from the framework of the invention.

We claim:

1. A method for processing plant-based materials, comprising the steps of:

(a) subjecting the materials to heat and pressure in a processing enclosure in two or more stages in which the temperature and pressure are held approximately constant after each increase; and (b) subjecting the heated, pressurized materials to a pressure-reduction phase during which the pressure in the processing enclosure is reduced at a rate greater than 500 millibars per second and by an amplitude greater than 1 bar.

2. The method of claim 1, wherein the pressure is reduced at a rate greater than 1 bar per second.

3. The method of claim 1, wherein the duration of the pressure-reduction phase is less than 2 seconds.

4. The method of claim 3, wherein the duration of the pressure-reduction phase is less than 0.5 seconds.

5. The method of claim 1 wherein the pressure is reduced by more than 9.5 bars in less than 0.5 seconds.

6. The method of claim 1, wherein the pressure is less than 0.5 bars after the pressure-reduction phase.

7. The method of claim 1, wherein the pressure-reduction phase is accomplished by equilibration of the pressure of the processing enclosure and the pressure of a vacuum reservoir to within 10% in less than one second.

8. The method of claim 1, wherein step (a) further comprises a preliminary pressure-reduction step prior to the heating and pressurizing.

9. The method of claim 1, wherein the increases in temperature are approximately synchronized with the increases in pressure.

10. The method of claim 1, wherein the heating of step (a) surpasses the glass transition phase of the materials.

11. The method of claim 1, further comprising the step of aspirating the materials from the processing enclosure into a recovery enclosure.

12. The method of claim 1, wherein the aspirated materials are subjected to cyclonic movement in the recovery enclosure that deposits the materials on the bottom of the recovery enclosure.

13. The method of claim 1, wherein:

the pressure is reduced at a rate greater than 1 bar per second;

the duration of the pressure-reduction phase is less than 2 seconds;

the pressure is less than 0.5 bars after the pressure-reduction phase;

the heating of step (a) is interrupted during the pressure-reduction phase;

the pressure-reduction phase is accomplished by equilibration of the pressure of the processing enclosure and the pressure of a vacuum reservoir to within 10% in less than one second;

step (a) further comprises a preliminary pressure-reduction step of between 10 seconds and 5 minutes prior to the heating and pressurizing;

the increases in temperature are approximately synchronized with the increases in pressure;

the heating of step (a) surpasses the glass transition phase of the materials;

the heating of step (a) is accomplished via at least one of injection of water vapor, convection, and infrared; and the plant-based materials are food products.

14. The method of claim 13, wherein:

the duration of the pressure-reduction phase is less than 0.5 seconds;

the pressure is reduced by more than 9.5 bars in less than 0.5 seconds;

the heating of step (a) increases the temperature from ambient to about 175 degrees C.; and the pressurizing of step (a) increases the pressure from about 1 bar to more than 9 bars.

15. The method of claim 13, further comprising the step of aspirating the materials from the processing enclosure into a recovery enclosure, wherein the aspirated materials are subjected to cyclonic movement in the recovery enclosure that deposits the materials on the bottom of the recovery enclosure.

16. An apparatus for processing plant-based materials, comprising:
   (a) means for subjecting the materials to heat and pressure in a processing enclosure in two or more stages in which the temperature and pressure are held approximately constant after each increase; and
   (b) means for subjecting the heated, pressurized materials to a pressure-reduction phase during which the pressure in the processing enclosure is reduced at a rate greater than 500 millibars per second and by an amplitude greater than 1 bar.

17. An apparatus for processing plant-based materials, comprising:
   (a) a processing enclosure adapted to receive, heat, and pressurize the materials to a pressure greater than the pressure of the atmosphere in two or more stages in which the temperature and pressure are held approximately constant after each increase; and
   (b) a vacuum reservoir adapted to be connected to the processing enclosure via a rapid-acting valve such that, when the valve is opened, the heated, pressurized materials in the processing enclosure are subjected to a pressure-reduction phase during which the pressure in the processing enclosure is reduced at a rate greater than 500 millibars per second and by an amplitude greater than 1 bar.

18. The apparatus of claim 17, wherein the capacity of the vacuum reservoir is at least 5 times greater than the capacity of the processing enclosure.

19. The apparatus of claim 18, wherein the capacity of the vacuum reservoir is at least 20 times greater than the capacity of the processing enclosure.

20. The apparatus of claim 17, wherein, when the valve is opened, the pressure of the processing enclosure and the pressure of the vacuum reservoir equilibrate to within 10% in less than one second.

21. The apparatus of claim 17, wherein the processing enclosure approximately synchronizes the increases in temperature with the increases in pressure.

22. The apparatus of claim 17, further comprising a recovery enclosure adapted to received the materials aspirated from the processing enclosure.

23. The apparatus of claim 22, wherein the recovery enclosure subjects the aspirated materials to cyclonic movement that deposits the materials on the bottom of the recovery enclosure.

24. The apparatus of claim 17, wherein:
   the capacity of the vacuum reservoir is at least 5 times greater than the capacity of the processing enclosure;
   when the valve is opened, the pressure is reduced at a rate greater than 1 bar per second;
   the duration of the pressure-reduction phase is less than 2 seconds;
   the pressure is less than 0.5 bars after the pressure-reduction phase;
   the processing enclosure interrupts the heating during the pressure-reduction phase;
   when the valve is opened, the pressure of the processing enclosure and the pressure of the vacuum reservoir equilibrate to within 10% in less than one second;
   the processing enclosure is further adapted to subject the materials to a preliminary pressure-reduction step of between 10 seconds and 5 minutes prior to the heating and pressurizing;
   the processing enclosure approximately synchronizes the increases in temperature with the increases in pressure;
   the processing enclosure applies heating that surpasses the glass transition phase of the materials;
   the processing enclosure applies heating via at least one of injection of water vapor, convection, and infrared; and
   the plant-based materials are food products.

25. The apparatus of claim 24, further comprising a recovery enclosure adapted to received the materials aspirated from the processing enclosure, wherein the aspirated materials are subjected to cyclonic movement in the recovery enclosure that deposits the materials on the bottom of the recovery enclosure.

26. A method for processing materials, comprising the steps of:
   (a) subjecting the materials to heat and pressure in a processing enclosure, wherein the pressure is greater than the pressure of the atmosphere;
   (b) subjecting the heated, pressurized materials to a pressure-reduction phase during which the pressure in the processing enclosure is reduced at a rate greater than 500 millibars per second and by an amplitude greater than 1 bar, wherein step (a) further comprises a preliminary pressure-reduction step prior to the heating and pressurizing; and
   (c) aspirating the materials from the processing enclosure into a recovery enclosure, wherein the aspired materials are subjected to cyclonic movement in the recovery enclosure that deposits the materials on the bottom of the recovery enclosure.

27. A method for processing materials, comprising the steps of:
   (a) subjecting the materials to heat and pressure in a processing enclosure, wherein the pressure is greater than the pressure of the atmosphere;
   (b) subjecting the heated, pressurized materials to a pressure-reduction phase during which the pressure in the processing enclosure is reduced at a rate greater than 500 millibars per second and by an amplitude greater than 1 bar; and
   (c) aspirating the materials from the processing enclosure into a recovery enclosure, wherein the aspirated materials are subjected to cyclonic movement in the recovery enclosure that deposits the materials on the bottom of the recovery enclosure.

28. The method of claim 27, wherein step (a) further comprises a preliminary pressure-reduction step prior to the heating and pressurizing.

* * * * *

UNITED STATES PATENT AND TRADEMARK OFFICE
CERTIFICATE OF CORRECTION

PATENT NO.   : 5,855,941
DATED        : January 5, 1999
INVENTOR(S)  : Karim Allaf et al.

It is certified that error appears in the above-identified patent and that said Letters Patent is hereby corrected as shown below:

Title page,
Please include the Assignee as follows: -- Gradient, Compiegne, France and Universal Dehydrates S.A., Liesse, France --

Signed and Sealed this

Twentieth Day of November, 2001

Attest:

*Nicholas P. Godici*

NICHOLAS P. GODICI
*Attesting Officer*   *Acting Director of the United States Patent and Trademark Office*